(12) United States Patent
Kokubo et al.

(10) Patent No.: US 8,002,364 B2
(45) Date of Patent: Aug. 23, 2011

(54) CONTROL UNIT OF BRAKE APPARATUS FOR VEHICLE

(75) Inventors: Koichi Kokubo, Nagoya (JP); Kazuya Maki, Nagoya (JP); Masayuki Naito, Takahama (JP)

(73) Assignee: Advics Co., Ltd., Kariya, Aichi-Pref. (JP)

( * ) Notice: Subject to any disclaimer, the term of this patent is extended or adjusted under 35 U.S.C. 154(b) by 1188 days.

(21) Appl. No.: 11/723,948

(22) Filed: Mar. 22, 2007

(65) Prior Publication Data

US 2007/0228823 A1 Oct. 4, 2007

(30) Foreign Application Priority Data

Apr. 3, 2006 (JP) ................................. 2006-101308

(51) Int. Cl.
*B60T 8/60* (2006.01)
(52) U.S. Cl. ...... 303/155; 303/152; 303/191; 303/114.3
(58) Field of Classification Search ............... 303/114.1, 303/114.3, 11, 152, 155, 191; 701/70
See application file for complete search history.

(56) References Cited

U.S. PATENT DOCUMENTS

| | | | |
|---|---|---|---|
| 6,231,134 B1 * | 5/2001 | Fukasawa et al. ............ 303/152 |
| 6,349,995 B1 * | 2/2002 | Itoh et al. .................... 303/116.1 |
| 6,428,120 B1 * | 8/2002 | Holl ............................. 303/191 |
| 6,439,674 B1 * | 8/2002 | Niino ........................... 303/152 |
| 7,284,803 B2 * | 10/2007 | Matsuura et al. ............ 303/152 |
| 7,316,457 B2 * | 1/2008 | Taniguchi et al. ........... 303/147 |
| 7,513,577 B2 * | 4/2009 | Taniguchi et al. ........... 303/146 |
| 7,516,008 B2 * | 4/2009 | Fukami et al. ................. 701/70 |
| 7,571,967 B2 * | 8/2009 | Saito et al. ................... 303/152 |
| 7,597,409 B2 * | 10/2009 | Kokubo et al. .............. 303/152 |
| 7,699,410 B2 * | 4/2010 | Beck et al. ................... 303/155 |
| 2005/0269875 A1 * | 12/2005 | Maki et al. ................... 303/152 |
| 2006/0125317 A1 * | 6/2006 | Kokubo et al. .............. 303/152 |
| 2008/0036294 A1 * | 2/2008 | Yamamoto et al. ........ 303/116.1 |

FOREIGN PATENT DOCUMENTS

JP 2004-009914 A 1/2004
JP 2006-021745 A 1/2006

* cited by examiner

*Primary Examiner* — Robert Siconolfi
*Assistant Examiner* — Mariano Sy
(74) *Attorney, Agent, or Firm* — Buchanan Ingersoll & Rooney PC

(57) ABSTRACT

A control unit of a brake apparatus includes a compensation braking force controlling device for controlling a compensation braking force in response to an operation of a brake operating member so that a characteristic of a total braking force relative to the operation of the brake operating member agrees with a predetermined target characteristic. The total braking force is a sum of the compensation braking force containing a pressurizing hydraulic braking force based upon at least the pressurization and a basic hydraulic pressure braking force based upon the basic hydraulic pressure. The compensation braking force controlling device includes: a judging device for judging whether the vehicle has stopped, and a limiting device for limiting the amount of pressurization via a pressure control valve when the judging device determines that the vehicle has stopped.

8 Claims, 11 Drawing Sheets

CONTROL UNIT OF BRAKE APPARATUS FOR VEHICLE

CROSS REFERENCE TO RELATED APPLICATIONS

This application is based on and claims priority under 35 U.S.C. §119 to Japanese Patent Application 2006-101308, filed on Apr. 3, 2006, and Japanese Patent Application 2005-221016, filed on Jul. 29, 2005, the entire content of which is incorporated herein by reference.

FIELD OF THE INVENTION

The present invention relates to a control unit of a brake apparatus for a vehicle.

BACKGROUND

Conventionally, it is known in the art to provide a brake apparatus for a vehicle, which automatically controls hydraulic pressure of wheel cylinders independently of an operation of a brake operating member such as a brake pedal by a driver. For example, an automatic braking device for a vehicle disclosed in JP2004-9914A includes: a master cylinder, which generates a basic hydraulic pressure (master-cylinder hydraulic pressure) based upon an operation of a vacuum booster according to the brake-pedal operation by a driver; a hydraulic pump that can generate a pressurizing hydraulic pressure higher than the basic hydraulic pressure and two normally open linear solenoid valves disposed system by system so as to control the amounts of pressurization (pressure differences) for respective systems to be applied to the basic hydraulic pressure using the pressurizing hydraulic pressure generated by the hydraulic pump.

For example, when a distance between a vehicle mounted with the above-described device and another vehicle driving ahead falls below a predetermined reference distance, this automatic braking device controls the hydraulic pump and the linear solenoid valve so as to adjust the amount of pressurization. Here, a wheel cylinder pressure is generated by adding the amount of pressurization to the basic hydraulic pressure. The hydraulic braking force is automatically controlled by applying such wheel cylinder pressure to the corresponding wheel cylinder. As a result, the vehicle is automatically applied with braking force independently of the operation of the brake-pedal operation by the driver.

As disclosed in JP2006-21745A, recent developments have led to a technology by which a regenerative cooperative braking control is implemented, which uses hydraulic braking force and a regenerative braking force by a motor. In this case, the above-described automatic braking device is applied to vehicles, which use motors as power supply, or what-is-called hybrid-electric vehicles (HEV), which use internal combustion engines and electric batteries to power electric motors.

More specifically, in the brake device disclosed in JP2006-21745A, the boosting characteristics of a vacuum booster is determined so that a basic hydraulic pressure corresponding to a depression amount against a brake pedal becomes lower than a predetermined target pressure value by a specified amount. As a result, "hydraulic braking force (basic hydraulic pressure braking force) based upon the basic hydraulic pressure (master-cylinder hydraulic pressure) can be lower than a preset target value by a specified amount.

Here, a compensation braking force is a regenerative braking force by a motor, a hydraulic braking force based upon the amounts of pressurization, or a combination thereof. A total braking force is the sum of the basic hydraulic pressure braking force and the compensation braking force. The compensation braking force, i.e., a regenerative braking force and/or a pressurizing hydraulic braking force, is adjusted according to the depression amount against the brake pedal. As a result, characteristics of the total braking force relative to the depression amount of the brake pedal then agrees with predetermined target characteristics, thereby preventing the driver from having an uncomfortable feeling.

Further, it has been recently proposed that a vacuum booster having the aforementioned boosting characteristics is applied to a vehicle, which employs only an internal combustion engine as power supply and is applied with the above-described automatic braking device. In such cases, a compensation braking force consists of only a pressurizing hydraulic braking force. That is, a total braking force is the sum of the basic hydraulic pressure braking force and the compensation braking force having only the pressurizing hydraulic braking force. The compensation braking force (pressurizing hydraulic braking force) is adjusted corresponding to the depression amount of the brake pedal in a manner that characteristics of the total braking force relative to the depression amount against the brake pedal agree with preset target characteristics.

Accordingly, it is possible to use a small-sized vacuum booster so that such vacuum booster is readily mounted on a vehicle. Further, characteristics of the total braking force relative to the depression amount of the brake pedal is designed to have more flexibilities so that various effects can be expected.

In a case where a vehicle is stationary, there is no need to generate braking force more than is required to keep the vehicle stationary. Such braking force required to keep the vehicle stationary is hereinafter referred to as a vehicle stopped state maintaining braking force. Therefore, also regarding a vehicle, which generates a total braking force being the sum of the basic hydraulic pressure braking force and the compensation braking force, when the vehicle is at the stopped state, there is no need to generate such total braking force more than is needed to keep the vehicle in a stopped state. In addition, when the vehicle is at the stopped state, a regenerative braking force is not generated. Therefore, no matter what type of vehicle it is, a motor vehicle or a hybrid vehicle, as far as the vehicle is at the stopped state, the compensation braking force is consisted of only the pressurizing hydraulic braking force, and the total braking force is consisted of only the hydraulic braking force, i.e., only the wheel cylinder pressure.

That is, as described above, as for a vehicle, which generates the total braking force being the sum of the basic hydraulic pressure braking force and the compensation braking force, when the vehicle is at the stopped state, there is no need to generate a wheel cylinder pressure, which is the sum of the basic hydraulic pressure and the amounts of pressurization (pressure differences), greater than the wheel cylinder pressure corresponding to the vehicle stopped state maintaining braking force. In other words, there is no need to increase the amounts of pressurization (pressure differences) generated by the linear solenoid valves.

Meanwhile, since the amounts of pressurization (pressure differences) are unnecessarily increased, i.e., since that a wheel cylinder pressure is unnecessarily increased, there is a possibility that various hydraulic pressure equipments, such as the linear solenoid valves, the hydraulic pumps, sealing of the wheel cylinders and so on, need to bear load. As described above, in order to reduce load subjected to those hydraulic equipments, it has been expected to prevent an unnecessary increase in a wheel cylinder pressure while a vehicle is at the stopped state.

The present invention has been made in view of the above circumstances, and provides a control unit applied to a brake apparatus for a vehicle, which generates a total braking force (=basic hydraulic pressure braking force+compensation braking force) by adding the compensation braking force to the basic hydraulic pressure braking force and prevents an unnecessary increase in a wheel cylinder pressure in a situation where the vehicle has stopped.

SUMMARY OF THE INVENTION

According to an aspect of the present invention, a brake apparatus for a vehicle, the brake apparatus includes: a basic-hydraulic-pressure generating means for generating a basic hydraulic pressure according to an operation of a brake operating member by a driver; a hydraulic pump for generating a pressurizing hydraulic pressure higher than a pressure level of the basic hydraulic pressure; and a pressure control valve for controlling an amount of pressurization to the basic hydraulic pressure by use of the pressurizing hydraulic pressure generated by the hydraulic pump. A sum of the basic hydraulic pressure and the pressurization corresponds to a wheel cylinder pressure applied to a wheel cylinder so as to generate at least a hydraulic braking force. The control unit of the brake apparatus includes: a compensation braking force controlling means for controlling a compensation braking force in response to the operation of the brake operating member so that a characteristic of a total braking force relative to the operation of the brake operating member agrees with a predetermined target characteristic. The total braking force is a sum of the compensation braking force containing a pressurizing hydraulic braking force based upon at least the pressurization and a basic hydraulic pressure braking force based upon the basic hydraulic pressure. The compensation braking force controlling means includes: a judging means for judging whether the vehicle has stopped; and a limiting means for limiting the amount of pressurization via the pressure control valve when the judging means judges that the vehicle has stopped.

BRIEF DESCRIPTION OF THE DRAWINGS

The foregoing and additional features and characteristics of the present invention will become more apparent from the following detailed description considered with reference to the accompanying drawings, wherein:

FIG. 7 is a diagram for explaining the relationship between the master-cylinder hydraulic pressure and the target wheel cylinder pressure, which the CPU refers to;

FIG. 8 is a diagram for explaining the relationship between a longitudinal acceleration and a road gradient, which the CPU refers to;

FIG. 9 is a diagram for explaining the relationship between the road gradient and a vehicle stopped state maintaining wheel cylinder pressure, which the CPU refers to;

FIG. 13 is a diagram for explaining the relationship between a vehicle-stopped-state maintaining wheel cylinder pressure and an upper limit of a linear-valve pressure difference, which the CPU of the brake apparatus of the second embodiment refers to.

DETAILED DESCRIPTION

Brake apparatuses for vehicles (brake control apparatuses for vehicles) according to embodiments of the present invention will be described below with the drawings attached hereto.

First Embodiment

Figure 1:
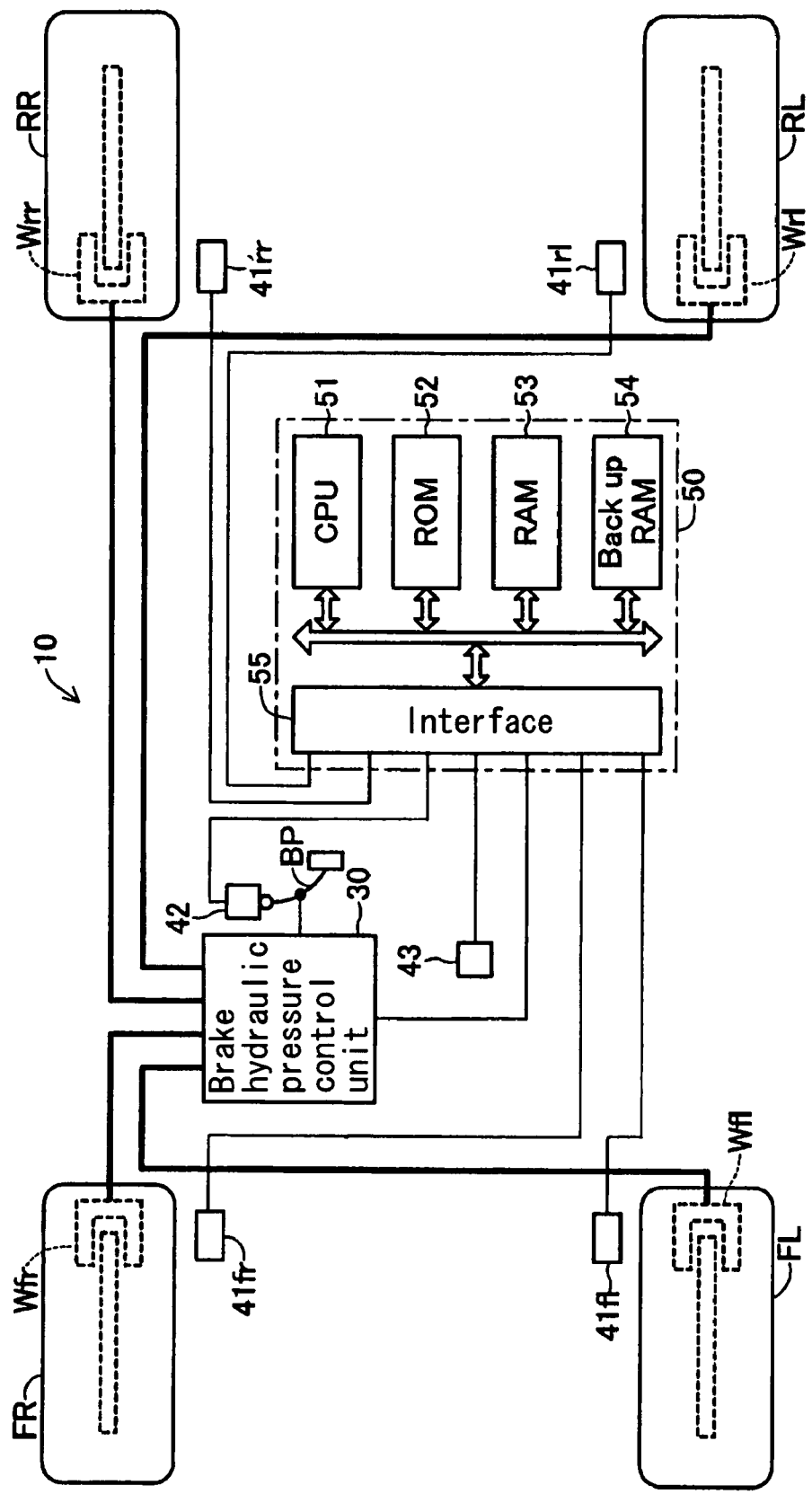
FIG. 1 is a block view schematically illustrating a vehicle mounted with a brake apparatus according to a first embodiment of the present invention.

FIG. 1 is a view schematically illustrating a vehicle mounted with a brake apparatus 10 according to a first embodiment of the present invention.

Figure 2:
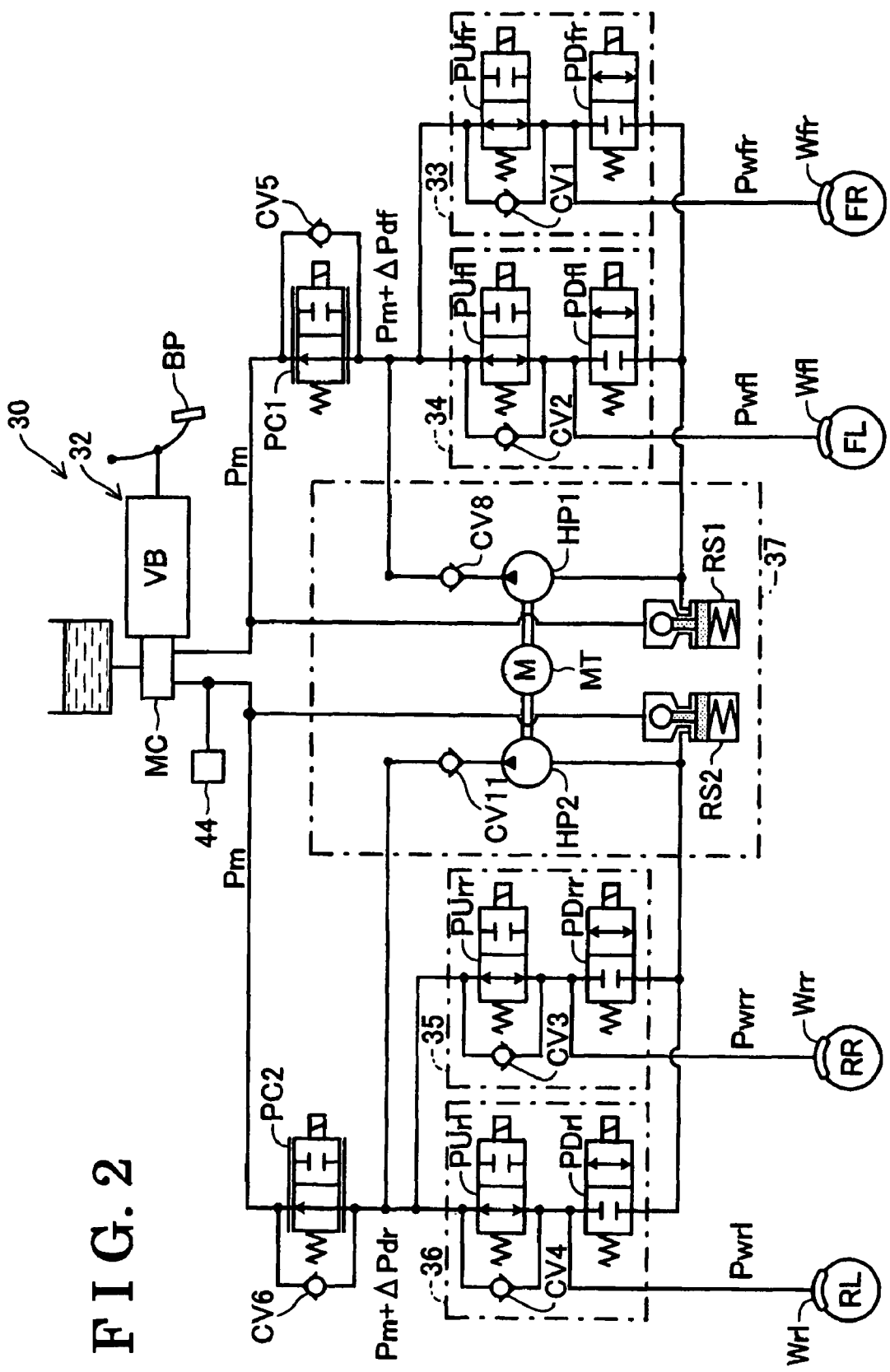
FIG. 2 is a view schematically illustrating a brake hydraulic pressure controller illustrated in FIG. 1.

The brake apparatus 10 for the vehicle includes a brake hydraulic pressure controller 30, which operates to generate, at each vehicle wheel, braking force corresponding to a brake hydraulic pressure. As illustrated in FIG. 2, the brake hydraulic pressure controller 30 includes: a brake hydraulic pressure generator 32, which generates brake hydraulic pressure according to an operation force (depression force or pressure) applied to a brake pedal BP (brake operating member); a FR-brake pressure control section 33, which controls brake hydraulic pressure supplied to a wheel cylinder Wfr mounted on a wheel FR of the vehicle; a FL-brake pressure control section 34, which controls brake hydraulic pressure supplied to a wheel cylinder Wfl mounted on a wheel FL of the vehicle; an RR-brake pressure control section 35, which controls brake hydraulic pressure supplied to a wheel cylinder Wrr mounted on a wheel RR of the vehicle; and an RL-brake pressure control section 36, which controls brake hydraulic pressure supplied to a wheel cylinder Wrl mounted on a wheel RL of the vehicle; and a reflux-brake-fluid supply section 37

The brake hydraulic pressure generator 32 includes a vacuum booster VB operatively responsive to an operation of the brake pedal BP and a master cylinder MC (basic-hydraulic-pressure generating means) connected to the vacuum booster VB.

The master cylinder MC has two systems of output ports including a first port for the wheels FR and FL and a second port for the wheels RR and RL. A normally open linear solenoid valve PC1 is located between the first port of the master cylinder MC and the upstream side of the FR-brake pressure control section 33 and the FL-brake pressure control section 34. Likewise, a normally open linear solenoid valve PC2 is located between the second port of the master cylinder MC and both of the upstream sides of the RR-brake pressure control section 35 and the RL-brake pressure control section 36. Details of the normally open linear solenoid valves PC1 and PC2 are described later.

The FR-brake pressure control section 33 includes a pressure-intensifying valve PUfr that is a two-port two-position switchover normally-open solenoid on-off valve, and a pressure-reducing valve PDfr that is a two-port two-position switchover normally-closed solenoid on-off valve. The pressure-intensifying valve PUfr can establish or interrupt a communication between the upstream side of the FR-brake pressure control section 33 and the wheel cylinder Wfr. The pressure-reducing valve PDfr can establish or interrupt a communication between the wheel cylinder Wfr and a reservoir RS1.

Likewise, the FL-brake pressure control section 34 includes a pressure-intensifying valve PUfl and a pressure-reducing valve PDfl. The RR-brake pressure control section 35 includes a pressure-intensifying valve PUrr and a pressure-reducing valve PDrr. The RL-brake pressure control section 36 includes a pressure-intensifying valve PUrl and a pressure-reducing valve PDrl.

The reflux-brake-fluid supply section 37 includes a direct current motor MT and two hydraulic pumps (gear pumps) HP1 and HP2 driven by the motor MT simultaneously. The hydraulic pump HP1 suctions brake fluid, which returns to the reservoir RS1 from the pressure-reducing valves PDfr and PDfl and supplies the brake fluid (pressurizing hydraulic pressure) via a check valve CV8 back to the upstream side of the FR-brake pressure control section 33 and the FL-brake pressure control section 34. The hydraulic pump HP2 operates in the same manner as described above.

The normally open linear solenoid valve PC1 will now be described below. The normally open linear solenoid valve PC1 is configured to be applied with an opening-directional force based upon a pressure difference obtained by subtracting a MC hydraulic pressure Pm from the hydraulic pressure at the upstream side of the FR-brake pressure control section 33 and at the upstream portion of the FL-brake pressure control section 34. The pressure difference corresponds to an amount of pressurization and is hereinafter referred to as a linear-valve pressure difference $\Delta Pdf$. The normally open linear solenoid valve PC1 is configured to be further applied with a closing-directional force based upon a magnetic attractive force that increases in proportion to an electric current (i.e., command current Id) supplied to the normally open linear solenoid valve PC1. The opening-directional force acts to control the normally open linear solenoid valve PC1 to be opened, while the closing-directional force acts to control the normally open linear solenoid valve PC1 to be closed.

Figure 3:
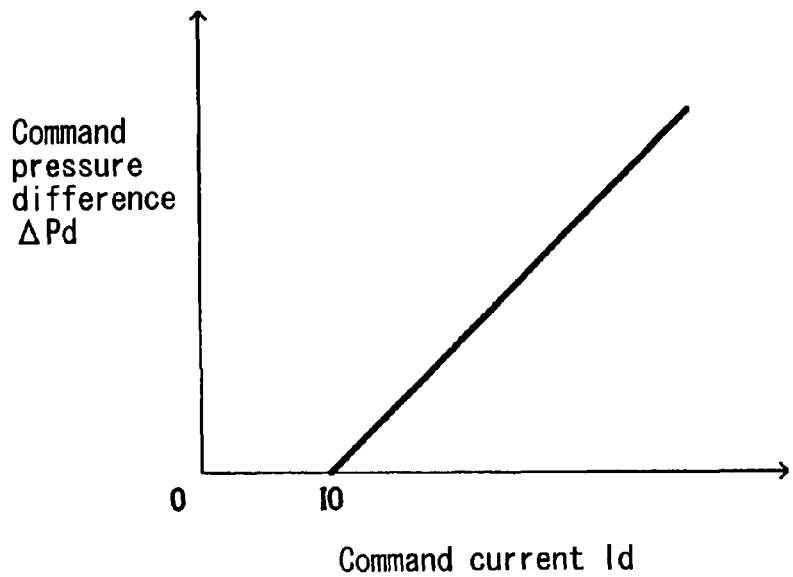
FIG. 3 is a diagram explaining the relationship between a command electric current and a command pressure difference, the command electric current which is to be supplied to a normally open linear solenoid valve illustrated in FIG. 2 and the command pressure difference which is to be generated thereby.

As a result, as shown in FIG. 3, a command pressure difference $\Delta Pd$ corresponding to the magnetic attractive force is determined to increase in proportion to the command current Id. Here, a value I0 at the x-axis of the diagram in FIG. 3 is a value of electric current corresponding to a biasing force of a coil spring of the normally open linear solenoid valve PC1. The normally open linear solenoid valve PC1 closes when the command pressure difference $\Delta Pd$ is greater than the linear-valve pressure difference $\Delta Pdf$, wherein a communication between the first port of the master cylinder MC and the upstream side of the FR-brake pressure control section 33 and the upstream portion of the FL-brake pressure control section 34 is interrupted by the normally open linear solenoid valve PC1. On the other hand, the normally open linear solenoid valve PC1 opens when the command pressure difference $\Delta Pd$ is smaller than the linear-valve pressure difference $\Delta Pdf$, wherein the communication between the first port of the master cylinder MC and the upstream side of the FR-brake pressure control section 33 and the upstream portion of the FL-brake pressure control section 34 is established by the normally open linear solenoid valve PC1.

As a result, provided the hydraulic pump HP1 is activated, the brake fluid at the upstream side of the FR-brake pressure control section 33 and the FL-brake pressure control section 34 flows towards the first port of the master cylinder MC via the normally open linear solenoid valve PC1 so that the linear-valve pressure difference $\Delta Pdf$ is adjusted to agree with the command pressure difference $\Delta Pd$. The brake fluid flowing into the first port of the master cylinder MC circulates back to the reservoir RS1.

In other words, when the motor MT (accordingly, the hydraulic pumps HP1 and HP2) is being driven, the linear-valve pressure difference $\Delta Pdf$ (the allowable maximum value thereof) is controlled corresponding to the command current Id supplied to the normally open linear solenoid valve PC1. Here, the pressure at the upstream side of the FR-brake pressure control section 33 and the FL-brake pressure control section 34 reaches a value (Pm+$\Delta Pdf$) that is the sum of the MC hydraulic pressure Pm and the linear-valve pressure difference $\Delta Pdf$.

Further, when the command current Id, which is supplied to the normally open linear solenoid valve PC1, is set at the maximum value, the command pressure difference $\Delta Pd$ is always greater than the linear-valve pressure difference $\Delta Pdf$, wherein the normally open linear solenoid valve PC1 is retained at the closed position. Therefore, the wheel cylinder (WC) pressures Pwfr and Pwfl are each maintained at constant levels at that time by setting the command current Id at the maximum value and by stopping the actuation of the hydraulic pump HP1.

Meanwhile, when the normally open linear solenoid valve PC1 is controlled at a non-energized state (i.e., the command current Id is set to "0"), the normally open linear solenoid valve PC1 remains at the open position by the biasing force of the coil spring. Here, the linear-valve pressure difference $\Delta Pdf$ reaches "0" to bring the pressure at the upstream side of the FR-brake pressure control section 33 and the FL-brake pressure control section 34 equal to the MC hydraulic pressure Pm.

The normally open linear solenoid valve PC2 has the same structure and function as those of the normally open linear solenoid valve PC1.

As described above, when all the solenoid valves of the brake hydraulic pressure controller 30 are at the non-energized state, each wheel cylinder W** is supplied with brake pressure (i.e., the MC hydraulic pressure Pm) according to an operation force applied to the brake pedal BP.

The symbol  affixed to the end of each variable indicates a comprehensive notation, such as "fl" and "fr", that is affixed to indicate which wheels the variable is for. For example, the wheel cylinder W comprehensively indicates the front left wheel cylinder Wfl, the front right wheel cylinder Wfr, the rear left wheel cylinder Wrl and the rear right wheel cylinder Wrr.

Further, according to the first embodiment, the WC pressures Pw are adjusted independently from one another by driving the motor MT (accordingly, the hydraulic pumps HP1 and HP2) and by controlling the normally open linear solenoid valves PC1, PC2 and the pressure-intensifying valves PU and the pressure-reducing valves PD**.

Going back to FIG. 1, the brake apparatus 10 for the vehicle further includes: wheel speed sensors 41, each of which outputs a signal having a pulse every time that the corresponding wheel  rotates at a predetermined rotation angle; a brake switch 42, which selectively outputs an ON signal (High signal) or an OFF signal (Low signal) in response to the presence or absence of the operation of the brake pedal BP; a longitudinal acceleration sensor 43 (a road gradient obtaining means), which detects an acceleration in a longitudinal direction of the vehicle (longitudinal acceleration Gx) and outputs a signal representing the detected longitudinal acceleration Gx; and a MC hydraulic pressure sensor 44 (see FIG. 2), which detects a MC hydraulic pressure (a MC hydraulic pressure) and outputs a signal representing the MC hydraulic pressure Pm.

The brake apparatus 10 for the vehicle further includes an electronic control unit 50 having a CPU 51 (a compensation braking force controlling means, the road gradient obtaining means) and so on.

(Control of Characteristic of WC Pressure)

Described below is an outline of the control of characteristic of WC pressure, which control is implemented by the brake apparatus 10 according to the first embodiment. Generally, there is a target characteristic (target braking force characteristic) for the characteristic of the braking force (total braking force) applied to the vehicle relative to a depression force applied to the brake pedal BP. Therefore, in the apparatus, which generates braking force only by use of the hydraulic braking force, there is a target characteristic for the characteristic of the WC pressure relative to the depression force applied to the brake pedal.

Figure 4:
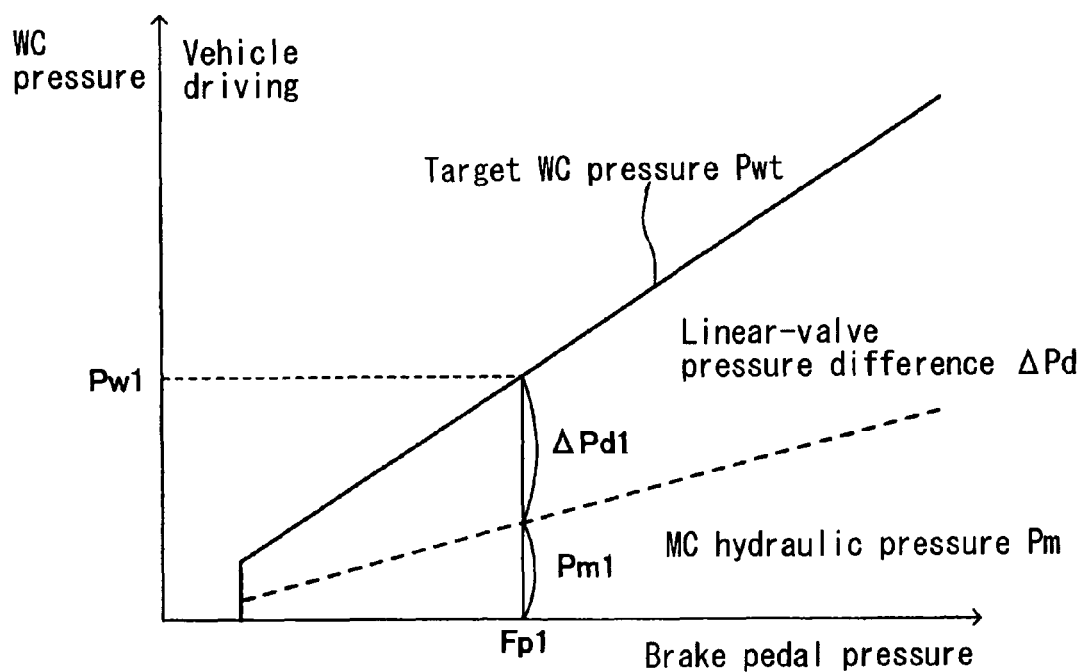
FIG. 4 is a diagram explaining the relationship of a master-cylinder hydraulic pressure and a target wheel cylinder pressure relative to a pressure applied to a brake pedal in the situation where the vehicle is running.

The solid line in FIG. 4 indicates the characteristic of a target value of the WC pressure (target WC pressure Pwt) relative to the depression force applied to the brake pedal BP. On the other hand, the broken line in FIG. 4 indicates the characteristic of the MC hydraulic pressure Pm outputted by the master cylinder MC, relative to the brake pedal depression force (pressure).

As is apparent from the comparison between the solid line and the broken line in FIG. 4, in this apparatus 10, the boosting characteristic of the vacuum booster VB is set such that the MC hydraulic pressure Pm relative to the brake pedal pressure is lower than a target WC pressure Pwt by a specified amount.

According to the first embodiment of the present invention, while a vehicle is driving, the apparatus compensates for the shortage of the MC hydraulic pressure Pm (basic hydraulic pressure) relative to the target WC pressure Pwt by the linear-valve pressure difference ΔPd (=ΔPdf=ΔPdr). The linear-valve pressure difference ΔPd corresponds to a compensation braking force. Accordingly, the characteristic of the WC pressure Pw(=Pm+ΔPd), which is obtained by adding the linear-valve pressure difference ΔPd to the MC hydraulic pressure Pm, agrees with the characteristic of the target WC pressure Pwt indicated by the solid line in FIG. 4.

For example, when the brake pedal pressure is a value Fp1, as shown in FIG. 4, the command current Id to each normally open linear solenoid valve PC1 and PC2 is controlled so that the linear-valve pressure difference ΔPd agrees with a value ΔPd1(=Pw1−Pm1) that is obtained by subtracting the MC hydraulic pressure Pm(=Pm1) corresponding to the value Fp1 from the target WC pressure Pwt (=Pw1) corresponding thereto.

Here, the hydraulic braking force based upon the MC hydraulic pressure Pm corresponds to a basic hydraulic pressure braking force, while the hydraulic braking force based upon the linear-valve pressure difference ΔPd corresponds to a pressurizing hydraulic braking force (=the compensation braking force). As described above, the characteristic of the total braking force (=the basic hydraulic pressure braking force+the pressurizing hydraulic braking force(=compensation braking force)) relative to the brake pedal pressure agrees with the target braking force characteristic.

(Outline of Limiting WC Pressure while a Vehicle has Stopped)

In the event that a vehicle has stopped, there is no need to generate a WC pressure Pw (=Pm+ΔPd), which WC pressure Pw is greater than a lower limit of a WC pressure required to maintain the vehicle stationary. The lower limit of the WC pressure is hereinafter referred to as a vehicle-stopped-state maintaining WC pressure Pwstop. Meanwhile, provided the WC pressure Pw is increased unnecessarily, sealing portions of the corresponding normally open linear solenoid valve PC1, PC2, the corresponding hydraulic pump HP1, HP2 and the corresponding wheel cylinder W** may suffer from an increased amount of load.

Figure 5:
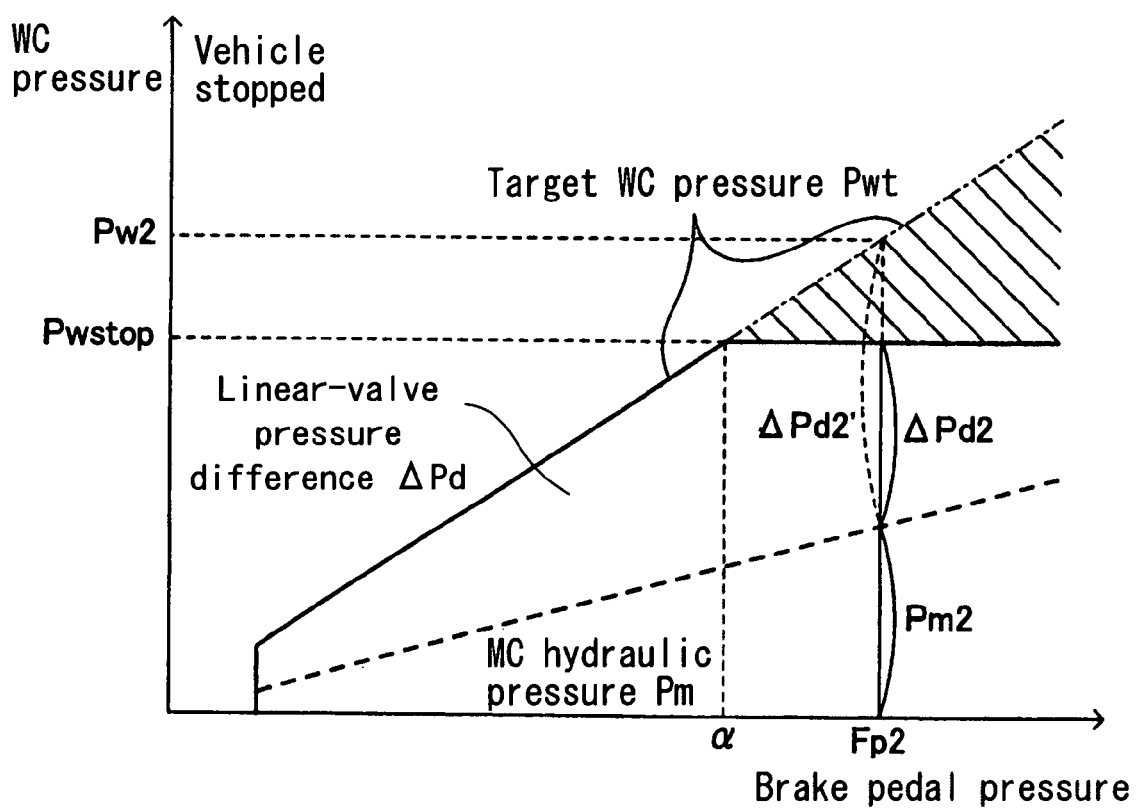
FIG. 5 is a diagram explaining a manner where a wheel cylinder pressure is restrained in the situation where the vehicle has stopped.

As described above, in order to reduce the amount of load which each component has to bear, as shown in FIG. 5, when the target WC pressure Pwt corresponding to the brake pedal pressure exceeds the vehicle-stopped-state maintaining WC pressure Pwstop (=the upper limit, the WC pressure upper limit) in the situation where the vehicle has stopped, the linear-valve pressure difference ΔPd is limited or restrained such that the WC pressure Pw does not exceed the vehicle-stopped-state maintaining WC pressure Pwstop. In FIG. 5, when the brake pedal pressure is greater than the value α, the target WC pressure Pwt exceeds the vehicle-stopped-state maintaining WC pressure Pwstop.

More specifically, for example in the situation where the vehicle has stopped, when the brake pedal pressure is greater than the value Fp2, which is greater than the value α, FIG. 5 shows the value ΔPd2′(=Pw2−Pm2) as the linear-valve pressure difference ΔPd. The valueΔPd2′ is obtained by subtracting the MC hydraulic pressure Pm (=Pm2) corresponding to the value Fp2 from the target WC pressure Pwt (=Pw2) corresponding to the value Fp2. However, according to the first embodiment, because the WC pressure should be controlled not to exceed the vehicle-stopped-state maintaining WC pressure Pwstop, the command current Id supplied to the corresponding normally open linear solenoid valves PC1 and PC2 is controlled so that the value ΔPd2′ is changed with the value ΔPd2 (=Pwstop−Pm2), i.e., the linear-valve pressure difference ΔPd agrees with the value ΔPd2 (=Pwstop−Pm2. The value ΔPd2 is obtained by subtracting the MC hydraulic pressure Pm (=Pm2) from the vehicle-stopped-state maintaining WC pressure Pwstop.

As described above, in the situation where the vehicle has stopped, limiting the WC pressure PW not to exceed the vehicle-stopped-state maintaining WC pressure Pwstop leads to the reduction in the potential load applied to each hydraulic pressure component, which potential load corresponds to the shaded portion in FIG. 5. Described above is the output of limiting the WC pressure while the vehicle has stopped.

(Actual Operation)

Described below is an actual operation of the brake apparatus 10 according to the first embodiment with reference to the flowchart illustrated in FIG. 6 (the compensation braking force controlling means).

Figure 6:
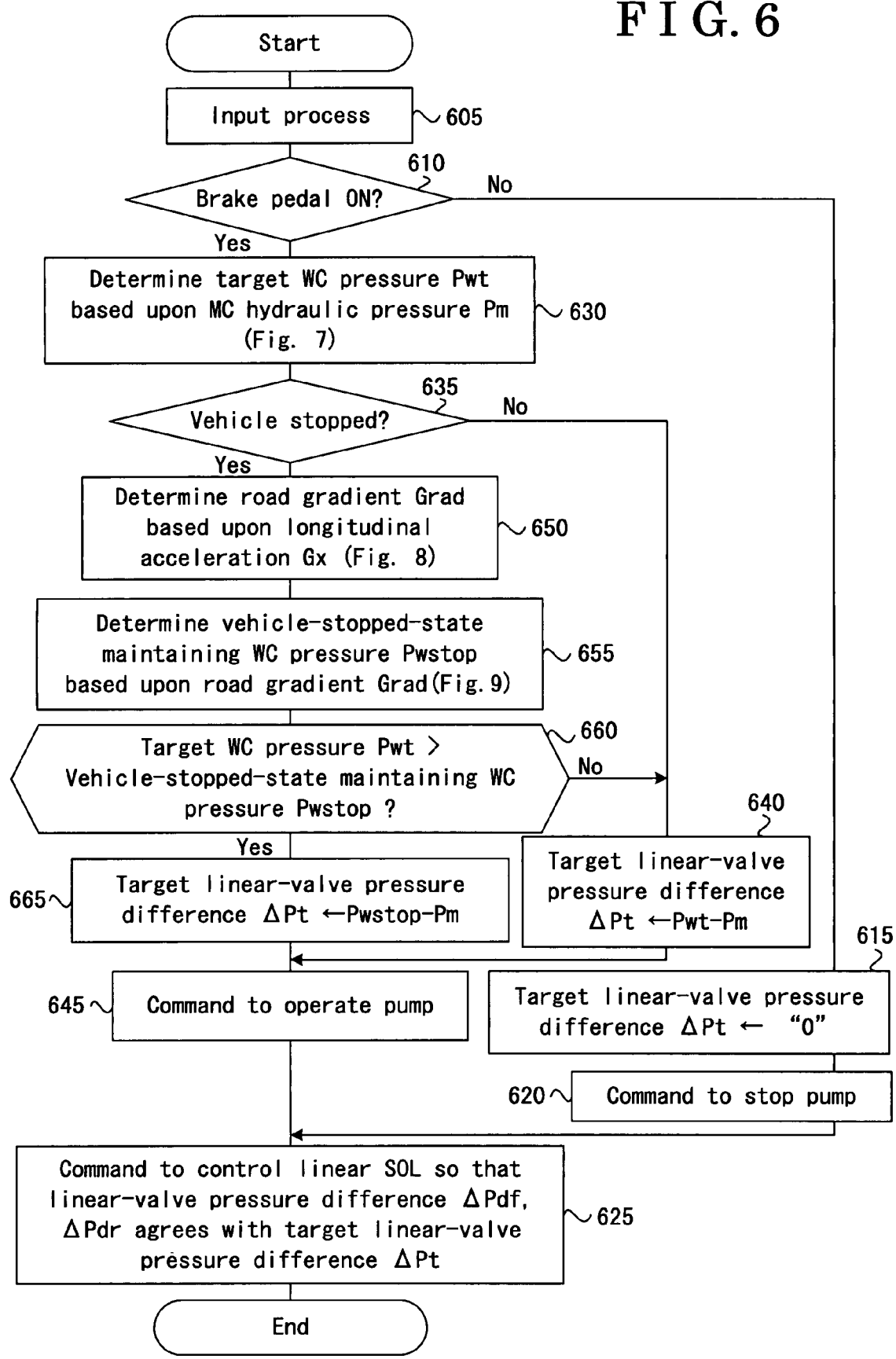
FIG. 6 is a flowchart for explaining a program or routine implemented by a CPU illustrated in FIG. 1.

The CPU51 repeatedly implements the routine or program in FIG. 6 every predetermined period of time or timing (e.g., 6 milliseconds). Therefore, in the predetermined period of time or timing, the CPU 51 initiates this routine. The routine then proceeds to step 605, wherein the values outputted by the sensors 41, 42, 43 and 44 (output signals) are inputted into the CPU 51.

The program then proceeds to step 610, wherein the CPU 51 judges whether a brake operation is in an ON state. According to the first embodiment, when the brake switch 42 outputs an ON signal, the CPU 51 determines that the brake operation is in an ON state. When the brake switch 42 outputs an OFF signal, the CPU 51 determines that the brake operation is in an OFF state.

The following description is applied when the vehicle is traveling and the brake operation is in the OFF state. When the negative answer NO is obtained in step 610, the routine proceeds to step 615, wherein the CPU 51 sets a target linear-valve pressure difference $\Delta Pt$ at "0". In step 620, the CPU 51 controls the motor MT to stop the actuations of the hydraulic pumps HP1 and HP2.

The routine then proceeds to step 625. In step 625, the CPU 51 controls the command current Id to be supplied to each normally open linear solenoid valves PC1 and PC2 in a way that the linear-valve pressure difference $\Delta Pd$ ($=\Delta Pdf=\Delta Pdr$) agrees with the target linear-valve pressure difference $\Delta Pt$ ("0" at this moment).

As a result, the hydraulic pumps HP1 and HP2 are stopped and the linear-valve pressure difference $\Delta Pd$ turns to the value "0". In such circumstances, because the brake operation is in the OFF state, the MC hydraulic pressure Pm is controlled at "0". Therefore, the WC pressure Pw ($=Pm+\Delta Pd$) is controlled at "0", wherein hydraulic braking force is not generated. The above described processes are repeatedly implemented as far as the CPU 51** determines that the brake operation is in the OFF state.

Described below is the situation in which a driver initiates operation of the brake pedal BP while a vehicle is running. Once the driver operates the brake pedal BP, the brake switch 42 outputs an ON signal. In step 610, the affirmative answer Yes is obtained and the program proceeds to step 630.

Figure 7:
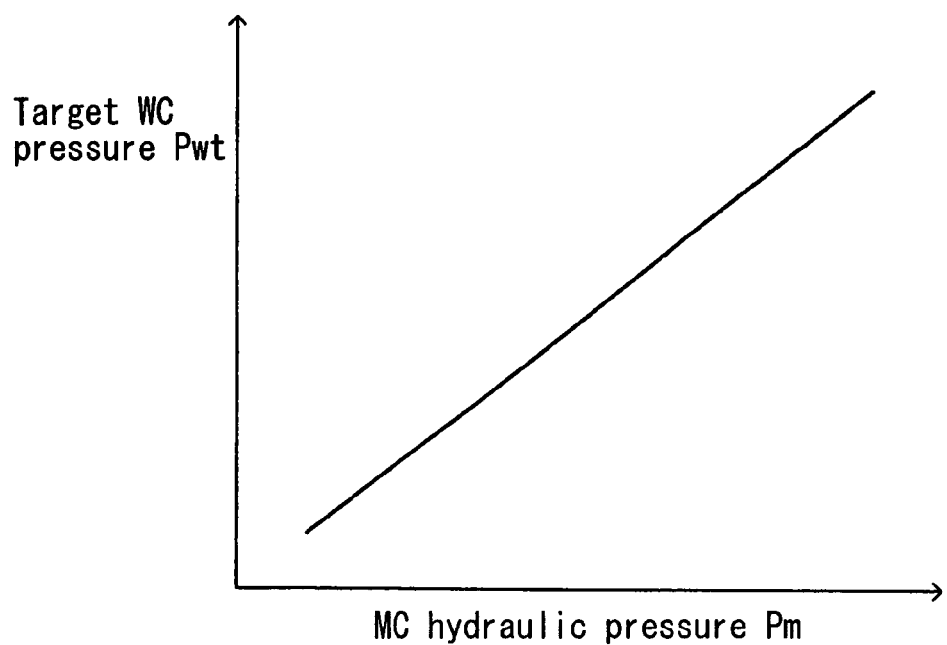

In step 630, the CPU 51 determines a target WC pressure Pwt based upon a MC hydraulic pressure Pm detected by the MC hydraulic pressure sensor 44 at that moment and a table or map pre-stored in a ROM 52. The table or map defines the relationship between the MC hydraulic pressure Pm and the target WC pressure Pwt and is summarized by the graph in FIG. 7. The relationship defined by this table or map corresponds to the relationship between the MC hydraulic pressure Pm and the target WC pressure Pwt summarized by the graph in FIG. 4. Therefore, the target WC pressure Pwt is determined at a larger value in proportion to or in accordance with the increase in the MC hydraulic pressure Pm.

The program then proceeds to step 635 (a judging means), wherein the CPU 51 (the judging means) judges whether the vehicle has stopped. According to the first embodiment of the present invention, the CPU 51 determines that the vehicle has stopped when a speed of the vehicle is measured to be "0". The speed of the vehicle is calculated by a conventional method with outputs of the wheel speed sensors 41\*\*. The CPU 51 determines that the vehicle has not stopped when the speed of the vehicle is controlled at a speed not being "0". When the vehicle travels at a considerably low speed, the following case may occur: a speed of the vehicle is computed to be "0" and the vehicle is determined to have stopped.

At that moment, it is immediately after the operation of the brake pedal BP has been initiated during the driving of the vehicle. Accordingly, a speed of the vehicle falls into a value different from "0". Therefore, a negative answer NO is obtained in step 635 and the program proceeds to step 640. In step 640, the target linear-valve pressure difference $\Delta Pt$ is set at a value ($=Pwt-Pm$) obtained by subtracting the MC hydraulic pressure Pm at that moment from the target WC pressure Pwt determined in step 630.

The program then proceeds to step 645, wherein the CPU 51 sends commands for activating the hydraulic pumps HP1 and HP2 to the motor MT. In step 625, the CPU 51 operates the hydraulic pumps HP1 and HP2 in a manner that the linear-valve pressure difference $\Delta Pd$ agrees with a value (Pwt−Pm) (see FIG. 4). As a result, the WC pressure Pw** ($=Pm+\Delta Pd$) is controlled so as to agree with the target WC pressure Pwt, wherein hydraulic braking force, which corresponds to the target WC pressure Pwt, is generated. The above-described processes are repeatedly implemented as far as the brake pedal BP is in the OFF state and the vehicle has not stopped.

Described below is the situation in which the vehicle has stopped where the brake pedal BP is in the ON state. Here, an affirmative answer Yes is obtained in step 635 and the program proceeds to step 650.

Figure 8:
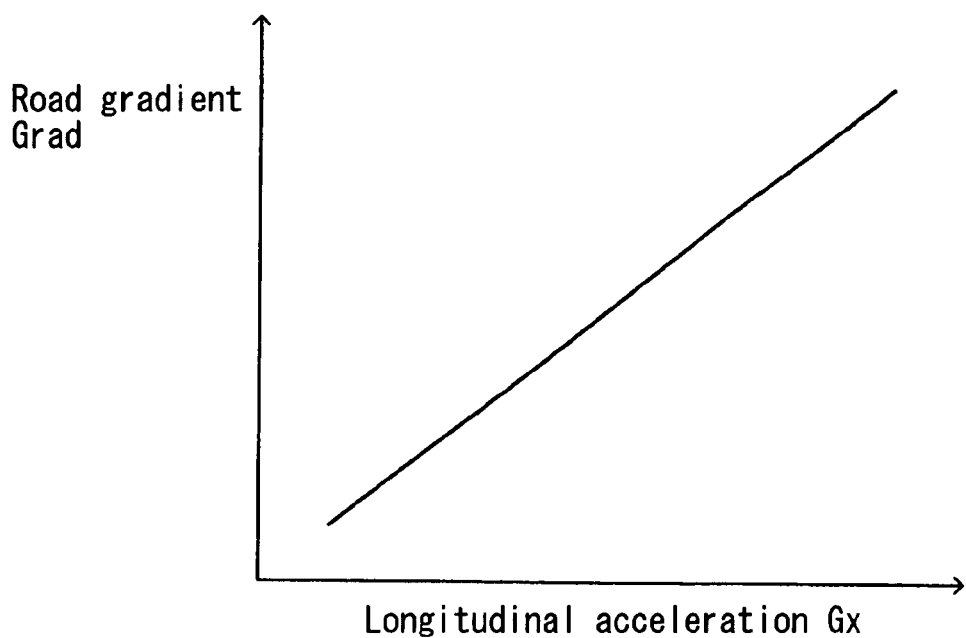

In step 650 (an upper limit setting means, a vehicle-stopped-state maintaining pressure obtaining means, the road gradient obtaining means), the CPU 51 (the upper limit setting means, the vehicle stopped state maintaining pressure obtaining means) determines a road gradient Grad in a pitching direction of the vehicle based upon a longitudinal acceleration Gx, which longitudinal acceleration Gx is detected by the longitudinal acceleration sensor 43 at this moment, and a table or map pre-stored in the ROM 52. The table or map defines the relationship between the longitudinal acceleration Gx and the road gradient Grad and is summarized by the graph in FIG. 8. The road gradient Grad is determined at a larger value in proportion to or in accordance with the increase in the longitudinal acceleration Gx.

The longitudinal acceleration Gx employed by this table or map is detected by one among from the longitudinal acceleration sensors that have different output characteristics, respectively, the one which outputs a value which is the minimum within the fluctuations of the output characteristics. Therefore, the road gradient Grad, which is determined based upon this table and the longitudinal acceleration sensor 43, does not fall to a value smaller than the actual value.

Figure 9:
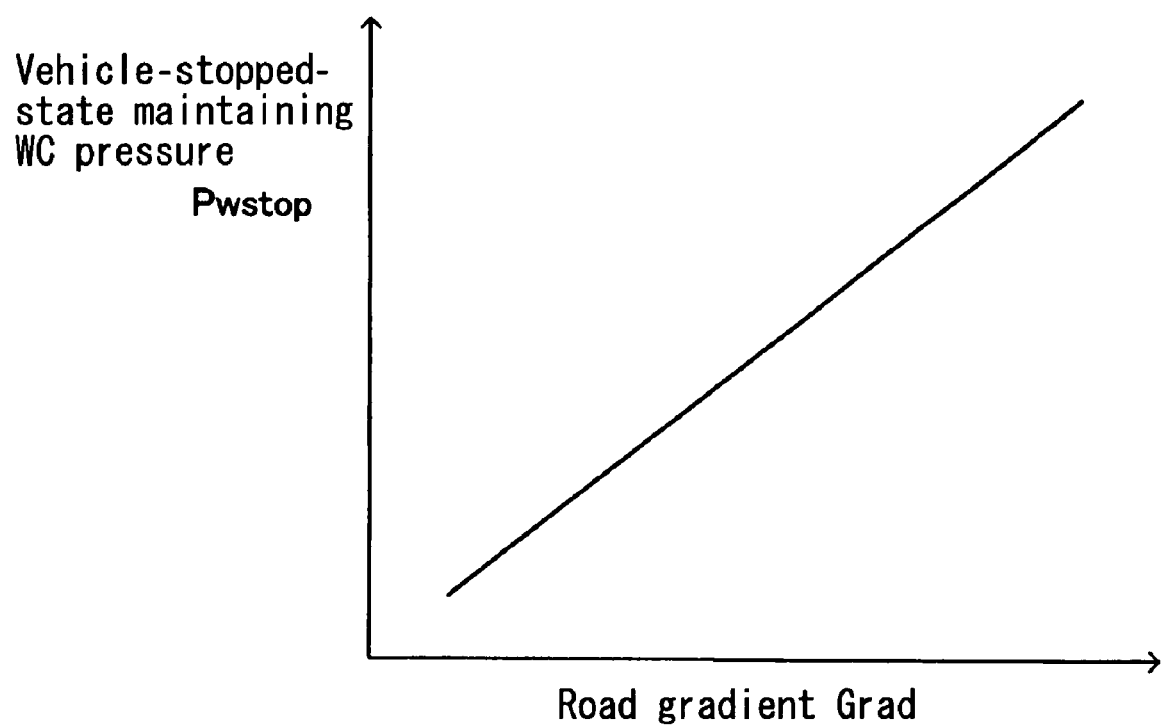

In step 655 (the upper limit setting means, the vehicle-stopped-state maintaining pressure obtaining means), the CPU 51 (the upper limit setting means, the vehicle stopped state maintaining pressure obtaining means) determines a vehicle-stopped-state maintaining WC pressure Pwstop based upon the road gradient Grad determined above and a table or map pre-stored in the ROM 52. The table or map defines the relationship between the road gradient Grad and the vehicle-stopped-state maintaining WC pressure Pwstop and is summarized in FIG. 9. Therefore, the vehicle-stopped-state maintaining WC pressure Pwstop is determined at a larger value in proportion to or in accordance with the increase in the road gradient Grad.

In step 660 (a limiting means), the CPU 51 (the limiting means) judges whether the target WC pressure Pwt determined in step 630 is greater than the vehicle-stopped-state maintaining WC pressure Pwstop. When a negative answer NO is obtained in step 660, the program proceeds to step 640. A negative answer NO is obtained in step 660 when a depression amount (pressure) applied to the brake pedal BP is smaller than the value $\alpha$ in FIG. 5. The CPU 51 then performs the processes in steps 640, 645 and 625 in this order.

In this situation, likewise as the case where the brake pedal BP is in the ON state and the vehicle has not stopped, the linear-valve pressure difference $\Delta Pd$ is controlled so as to agree the value (Pwt-Pm) and the WC pressure Pw**(=Pm+ΔPd) is controlled so as to agree with the target WC pressure Pwt (≦Pwstop).

On the other hand, when an affirmative answer Yes is obtained in step 660, the program proceeds to step 665 (the limiting means). An affirmative answer Yes is obtained in step 660 when a depression amount (pressure) applied to the brake pedal BP is the value α or more in FIG. 5. The CPU 51 then sets the target linear-valve pressure difference ΔPt at a value obtained by subtracting the MC hydraulic pressure Pm at this moment from the vehicle-stopped-state maintaining WC pressure Pwstop, and performs the processes in steps 645 and 625 in this order.

As described above, the hydraulic pumps HP1 and HP2 are operated and the linear-valve pressure difference ΔPd is controlled so as to agree with the value (Pwstop−Pm). As a result, the WC pressure Pw** (=Pm+ΔPd) is controlled so as to agree with the vehicle-stopped-state maintaining WC pressure Pwstop, and hydraulic braking force, which corresponds to the vehicle-stopped-state maintaining WC pressure Pwstop, is generated.

As described above, when the brake pedal BP is in the ON state and the vehicle has stopped, linear-valve pressure difference ΔPd (=ΔPdf=ΔPdr) is controlled in a manner that the WC pressure Pw**(=Pm+ΔPd) does not exceed the vehicle-stopped-state maintaining WC pressure Pwstop.

As described above, in the brake apparatus 10 (brake control apparatus for a vehicle) of the first embodiment of the present invention, while the vehicle is driving, the hydraulic pumps HP1 and HP2 are operated and the linear-valve pressure difference ΔPd (=ΔPdf=ΔPdr) is controlled in a manner that the WC pressure Pw (=Pm+ΔPd) agrees with the target WC pressure Pwt corresponding to the pressure applied to the brake pedal BP, i.e., corresponding to the MC hydraulic pressure Pm. The WC pressure Pw (=Pm+ΔPd) is determined by adding the linear-valve pressure difference ΔPd (=ΔPdf=ΔPdr) to the MC hydraulic pressure Pm outputted by the master cylinder MC (see FIG. 4).

On the other hand, while the vehicle is determined to have stopped, each hydraulic pump HP1 and HP2 is operated and the linear-valve pressure difference ΔPd (=ΔPdf=ΔPdr) is controlled and limited in a manner that the WC pressure Pw** (=Pm+ΔPd) does not exceed the vehicle-stopped-state maintaining WC pressure Pwstop that is the lower limit of the WC pressure required to maintain the vehicle stationary.

Therefore, while the vehicle has stopped, it is possible to prevent an unnecessary increase in the WC pressure Pw and to minimize load to be applied to some components such as sealing portions of the normally open linear solenoid valves PC1 and PC2, the hydraulic pumps HP1 and HP2, the wheel cylinder W, and so on.

The present invention does not have to be limited to the above-described first embodiment, and various modifications can be employed within the scope of the present invention. According to the first embodiment, the corresponding hydraulic pump HP1 and HP2 is kept operating while the WC pressure Pw (=Pm+ΔPd) has been limited to the vehicle-stopped-state maintaining WC pressure Pwstop while the vehicle has stopped, i.e., while the pressure applied to the brake pedal BP is the value α or more while the vehicle has stopped. However, the hydraulic pump HP1 and HP2 can be stopped while the WC pressure Pw (=Pm+ΔPd) has been limited to the vehicle-stopped-state maintaining WC pressure Pwstop.

Figure 10:
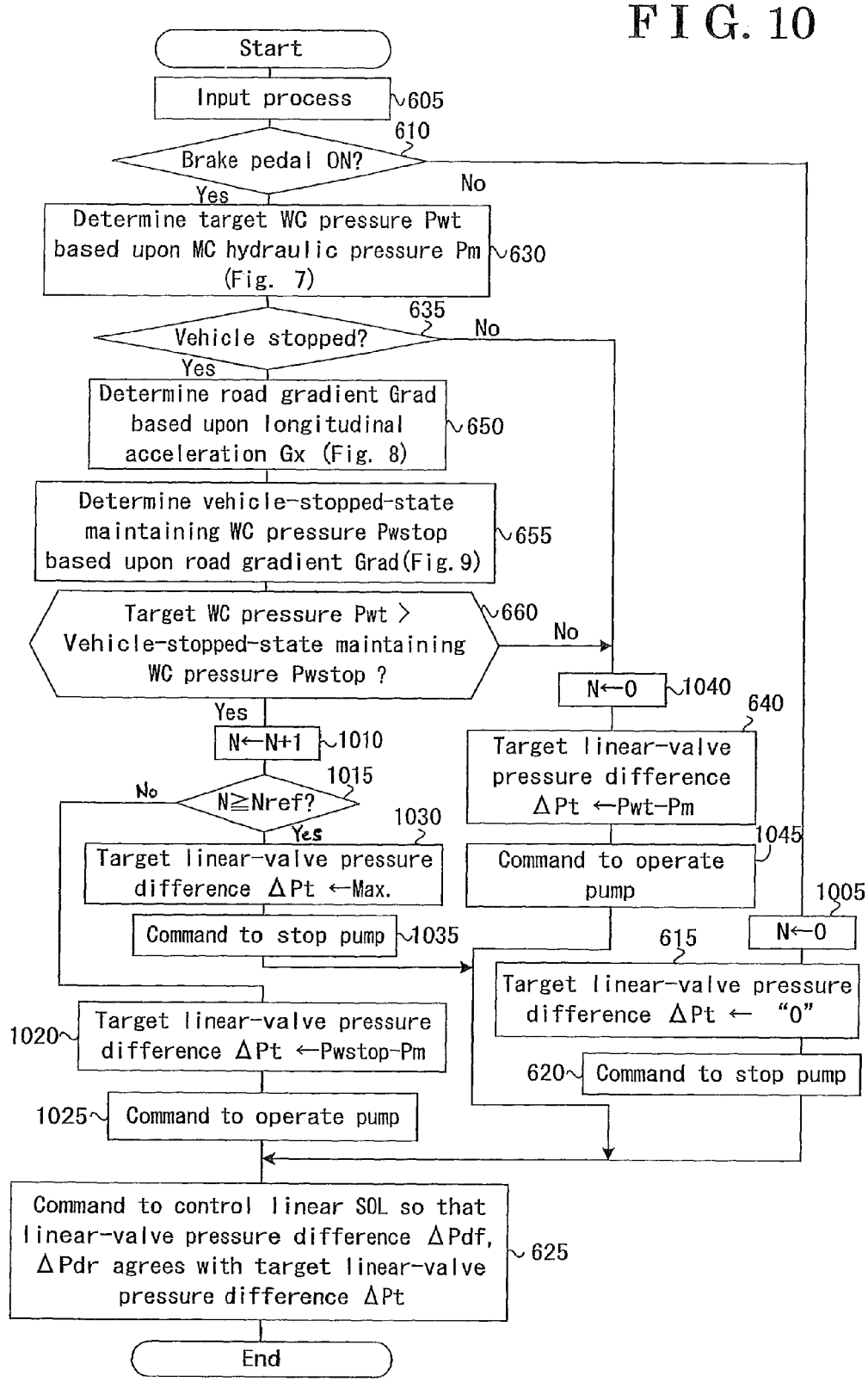
FIG. 10 is a flowchart for explaining a program or routine implemented by the CPU of the brake apparatus according to a modified example of the first embodiment.

In this case, the program illustrated in FIG. 10 (the compensation braking force controlling means) substitutes for the program illustrated in FIG. 6. Described below is the program illustrated in FIG. 10. Steps in FIG. 10, which are implemented also in FIG. 6, are denoted with the same step numbers employed in FIG. 6, and description thereof will be omitted. This is applied to FIG. 12 as well.

The flowchart illustrated in FIG. 10 differs from the flowchart illustrated in FIG. 6 in that the flowchart does not include steps 645 and 665 in FIG. 6 and includes steps 1005 to 1045. The processes implemented in steps 1025 and 1045 are substantially the same as the process in step 645 in FIG. 6. The process in step 1020 in FIG. 10 is substantially the same as the process in step 665 in FIG. 6.

The process in step 1005 is implemented when the CPU 51 determines that the brake pedal BP is in the OFF state. The process in step 1040 is implemented when the CPU 51 determines that the brake pedal BP is in the ON state and the vehicle has not stopped, or when the CPU 51 determines that the brake pedal BP is in the ON state and the vehicle has stopped and a negative answer NO is obtained in step 660. That is, in step 660, the counter N is set at the initial value "0" apart from the situation that the brake pedal is in the ON state, the vehicle has stopped, and an affirmative answer Yes is obtained in step 660.

On the other hand, every time that the following three conditions are satisfied: 1) the brake pedal BP is in the ON state; 2) the vehicle has stopped; and 3) an affirmative answer Yes is obtained in step 660, the counter N is incremented by "1" in step 1010. As described above, the counter N represents the number of successive times by which the three conditions are satisfied in series.

In step 1015, the CPU 51 judges whether the value of the counter N has reached a predetermined value Nref (integer at "2" or more). The predetermined value Nref represents a period of time required for the linear-valve pressure difference ΔPd to be reduced to the target linear-valve pressure difference ΔPt. The required period of time is a very short time.

Here, assuming that it is immediately after that these three conditions have been satisfied after the CPU 51 determines that the brake pedal BP is in the ON state and the vehicle has stopped, the counter N turns to "1" in step 1010 and has not reached the predetermined value Nref. Therefore, a negative answer No is obtained in step 1015 and the processes in steps 1020, 1025 and 625 are implemented in this order, wherein the linear-valve pressure difference ΔPd is controlled to agree with the value (Pwstop-Pm). The aforementioned processes are repeatedly implemented until the counter N reaches the predetermined value Nref.

Once the counter N reaches the predetermined value Nref, i.e., once the linear-valve pressure difference ΔPd is reduced or limited to the value (Pwstop-Pm) and the WC pressure Pw** is attenuated to the value Pwstop, an affirmative answer Yes is obtained in step 1015 and the program proceeds to step 1030 (the limiting means). In step 1030, the CPU 51 controls the target linear-valve pressure difference ΔPt at the maximum value. In step 1035 (the limiting means), the CPU 51 controls the motor MT to stop the hydraulic pumps HP1 and HP2. The process in step 625 is then performed.

Accordingly, the operation of the hydraulic pumps HP1 and HP2 is stopped and the normally open linear solenoid valves PC1 and PC 2 are controlled at the closed states. As a result, the WC pressure Pw is maintained at the value Pwstop at this moment. In other words, the WC pressure Pw is limited to the vehicle-stopped-state maintaining WC pressure Pwstop.

As described above, when the program illustrated in FIG. 10 is performed so as to limit the corresponding WC pressure Pw to the vehicle-stopped-state maintaining WC pressure Pwstop, i.e., when the pressure applied to the brake pedal BP is the value α or more in FIG. 5, the corresponding hydraulic pump H1 and H2 is stopped after the linear-valve pressure difference ΔPd reaches the value (Pwstop-Pm). Therefore, it is possible to save energy required to actuate each hydraulic pump HP1 and HP2 while the WC pressure Pw has been limited to the vehicle-stopped-state maintaining WC pressure Pwstop.

Second Embodiment

Described below is the brake apparatus (brake control apparatus for a vehicle) according to the second embodiment of the present invention. According to the first embodiment, the linear-valve pressure difference ΔPd is controlled in a manner that the WC pressure Pw does not exceed the upper limit Pwstop while the vehicle has stopped. However, according to the second embodiment of the present invention, the linear-valve pressure difference ΔPd is limited so as not to exceed the upper limit ΔPds of the linear-valve pressure difference ΔPd.

Figure 11:
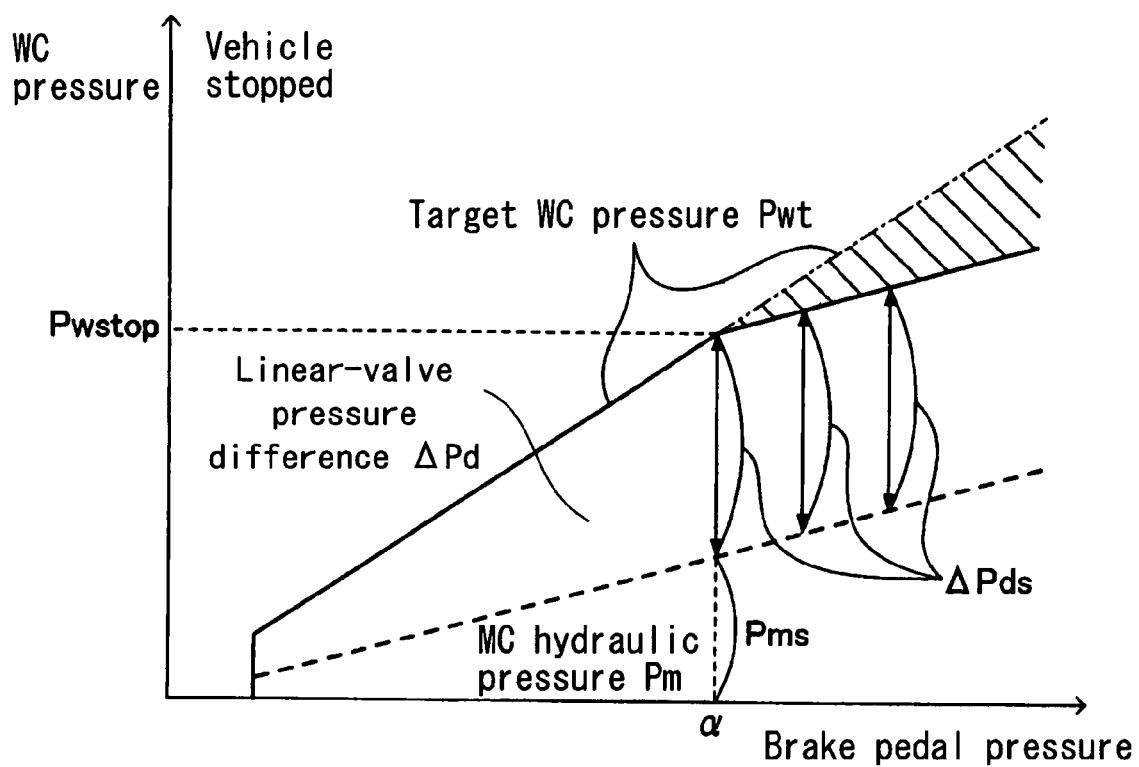
FIG. 11 is a diagram for explaining a manner where a wheel cylinder pressure is restrained by a brake apparatus for a vehicle according to a second embodiment in the situation where the vehicle has stopped.

As illustrated in FIG. 11, in the situation where the target WC pressure Pwt exceeds the vehicle-stopped-state maintaining WC pressure Pwstop while the vehicle has stopped, i.e., when a pressure applied to the brake pedal BP is greater than the value α in FIG. 11, the CPU 51 controls the command currents Id to be supplied to the normally open linear solenoid valves PC1 and PC2 in a manner that the linear-valve pressure difference ΔPd is maintained at the upper limit ΔPds.

As is obvious from FIG. 11, the upper limit ΔPds is determined by subtracting the MC hydraulic pressure Pm (=Pms) from the vehicle-stopped-state maintaining WC pressure Pwstop. The MC hydraulic pressure Pm (=Pms) corresponds to the one in the situation where the target WC pressure Pwt agrees with the vehicle-stopped-state maintaining WC pressure Pwstop.

In other words, according to the second embodiment, the linear-valve pressure difference ΔPd is limited and maintained at the upper limit ΔPds while the value (Pwt-Pm), which is obtained by subtracting the MC hydraulic pressure Pm from the target WC pressure PWt, exceeds the upper limit ΔPds (=Pwstop−Pms) in the situation where the vehicle has stopped.

Accordingly, in the situation where the vehicle has stopped, it is possible to reduce potential load to be applied to components such as sealing portions of the normally open linear solenoid valves PC1, PC2, the hydraulic pumps HP1, HP2 and the wheel cylinders W**, and so on. The reduction of such potential load corresponds to the shaded area in FIG. 11.

(Actual Operation of the Second Embodiment)

Described below is the actual operation of the brake apparatus for the vehicle according to the second embodiment. The CPU 51 implements the program illustrated by the flowchart in FIG. 12 (the compensation braking force controlling means) in substitution for the program illustrated in FIG. 6.

Figure 12:
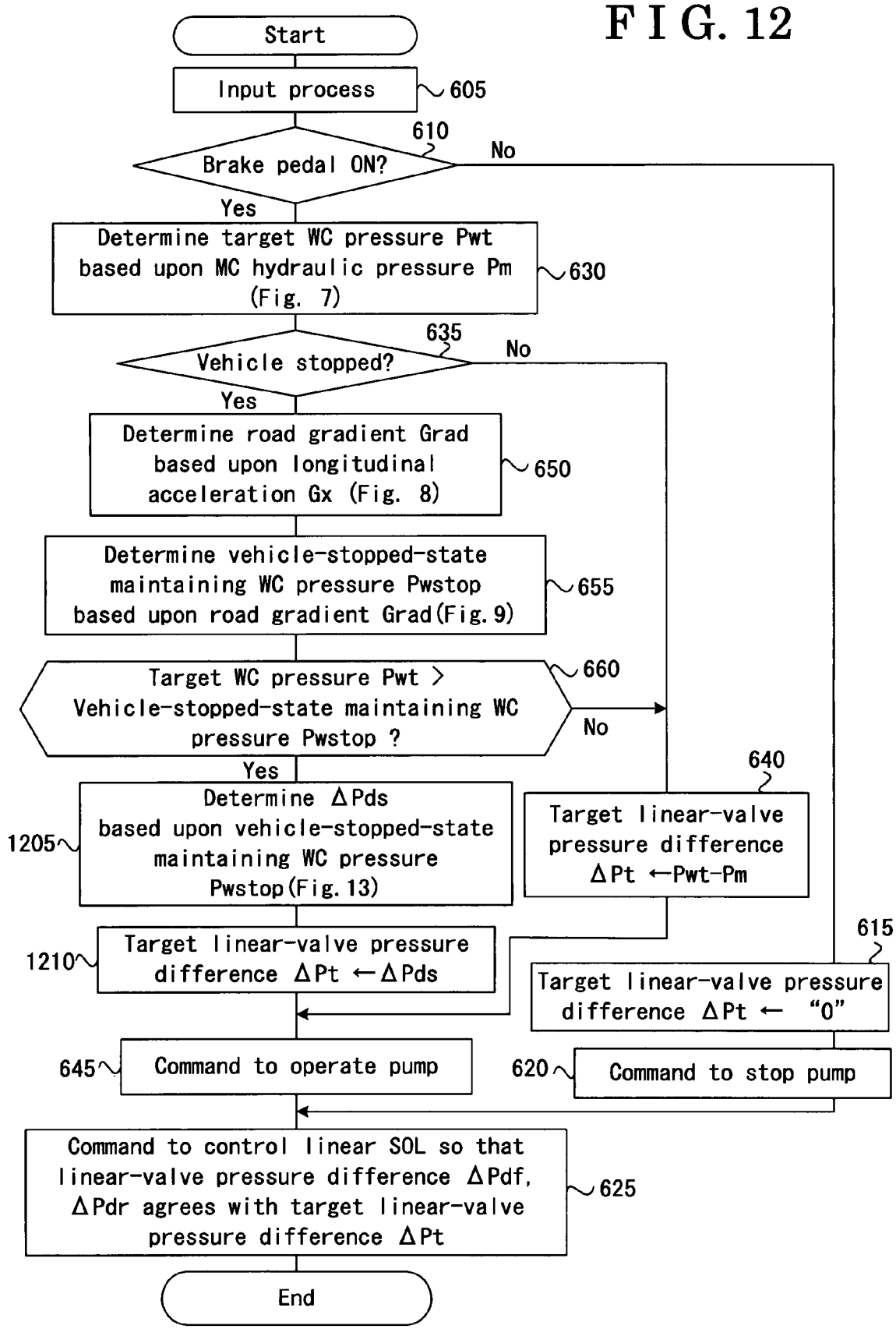
FIG. 12 is a flowchart for explaining a routine or program implemented by a CPU of the brake apparatus according to the second embodiment.

The flowchart illustrated in FIG. 12 is different from the one in FIG. 6 in that step 665 in FIG. 6 is substituted by steps 1205 (the limiting means) and 1210 (the limiting means).

Figure 13:
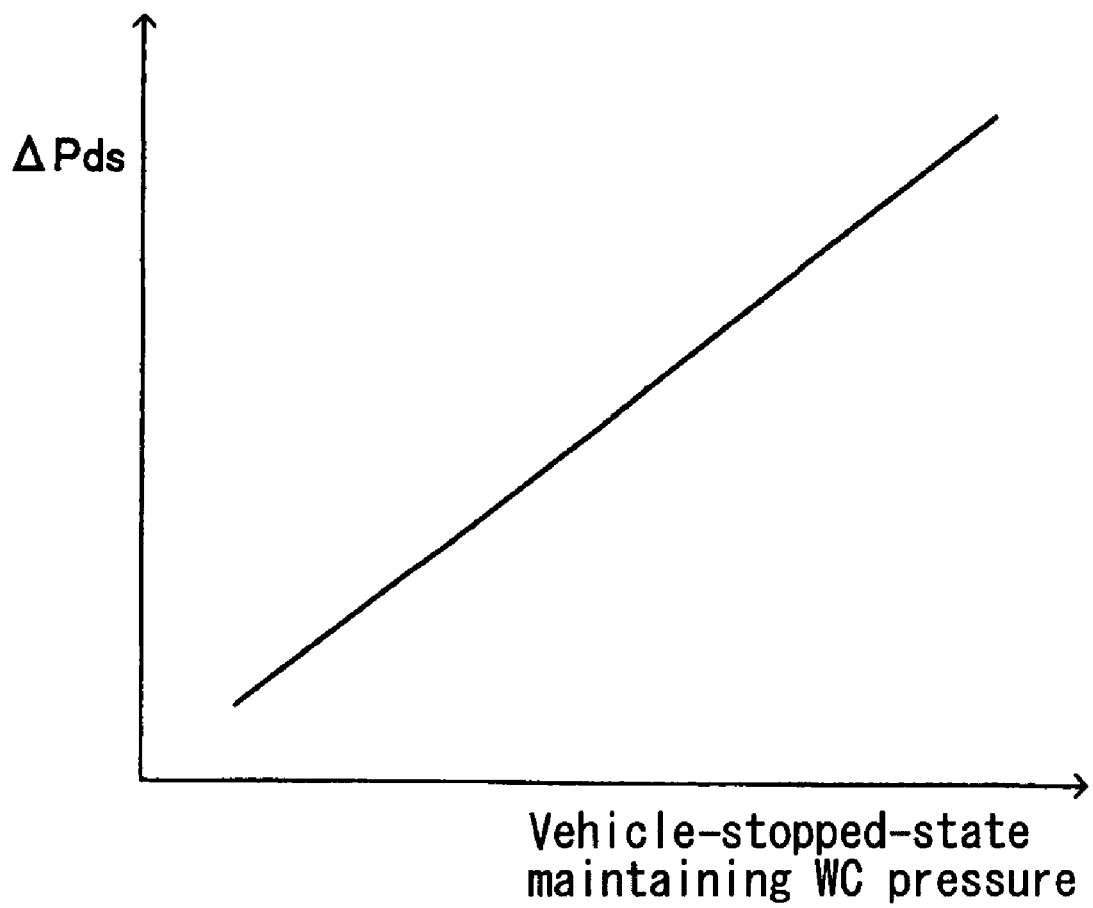

In step 1205 (the upper limit setting means), the upper limit ΔPds is determined based upon the vehicle-stopped-state maintaining WC pressure Pwstop, which has been determined in step 655 in FIG. 12, and a table or map pre-stored in the ROM 52. The table or map defines the relationship between the vehicle-stopped-state maintaining WC pressure Pwstop and the upper limit ΔPds and is summarized in FIG. 13. Therefore, the upper limit ΔPds is determined at the greater value in proportion to or in accordance with the increase in the vehicle-stopped-state maintaining WC pressure Pwstop.

As is apparent from FIG. 11, this relationship originates in that the inclination or gradient in the increase of the target WC pressure Pwt relative to the increase in the brake pedal pressure is greater than the inclination or gradient in the increase in the MC hydraulic pressure Pm relative to the increase in the brake pedal pressure.

In step 1210 (the limiting means, the upper limit setting means), the target linear-valve pressure difference ΔPt is set to be equal to the upper limit ΔPds determined in step 1205.

As a result, when an affirmative answer Yes is obtained in step 660, i.e., when the target WC pressure Pwt exceeds the vehicle-stopped-state maintaining WC pressure Pwstop while the vehicle has stopped (when the brake pedal pressure is greater than the value α in FIG. 11, the command current Id, which are applied to the corresponding normally open linear solenoid valve PC1 and PC2, is controlled in a way that the linear-valve pressure difference ΔPd is maintained at the upper limit ΔPds while the corresponding hydraulic pump HP1 and HP2 is actuated.

As described above, also by the brake apparatus of the second embodiment, it is possible to prevent an unnecessary increase in the WC pressure Pw and to reduce load applied to some components such as sealing portions of the normally open linear solenoid valves PC1 and PC2, the hydraulic pumps HP1 and HP2, the wheel cylinder W, and so on.

The present invention is not limited to the above-described first and second embodiments and can be modified with the scope of the invention. For example, according to the first and second embodiments, the vehicle-stopped-state maintaining WC pressure Pwstop varies in response to the road gradient Grad. Alternatively, the vehicle-stopped-state maintaining WC pressure Pwstop can be a fixed value. In such cases, it is preferable that the vehicle-stopped-state maintaining WC pressure Pwstop is set at a value corresponding to the case where the road gradient Grad turns to a possible maximum value Further, according to the first and second embodiments, the target WC pressure Pwt is determined only based upon the MC hydraulic pressure Pm (see step 630 in FIG. 7). Alternatively, the target WC pressure Pwt can be determined based upon other parameters (e.g., speed of the vehicle) in addition to the MC hydraulic pressure Pm.

Provided that the brake apparatus described above is applied to or mounted on an electrically-powered vehicle, which has a motor as a driving power source or a hybrid-type vehicle, a regenerative braking force, which is generated by the motor, can be utilized, in addition to the hydraulic braking force based upon the linear-valve pressure difference ΔPd, as the compensation braking force which compensates for the shortage of the MC hydraulic pressure PM relative to the target WC pressure Pwt.

According to the above described embodiments, as illustrated in FIG. 2, the brake apparatus is applied to a vehicle having a fluid pressure circuit with a H conduit system, one conduit system for the front-right and front-left wheels and the other conduit system for the rear-right and rear-left wheels. Alternatively, the brake apparatus is applied to a vehicle having a different conduit system such as a cross (X) dual conduit system (diagonal conduit system), one conduit system for front-right and rear-left wheels and the other conduit system for front-left and rear-light wheels.

The brake apparatus includes: a basic-hydraulic-pressure generating means for generating a basic hydraulic pressure according to an operation of a brake operating member by a driver; a hydraulic pump for generating a pressurizing hydraulic pressure higher than a pressure level of the basic hydraulic pressure; and a pressure control valve for controlling an amount of pressurization to the basic hydraulic pressure by use of the pressurizing hydraulic pressure generated by the hydraulic pump. A sum of the basic hydraulic pressure and the pressurization corresponds to a wheel cylinder pressure applied to a wheel cylinder so as to generate at least a hydraulic braking force.

The basic-hydraulic-pressure generating means is configured to have for example a master cylinder which generates the basic hydraulic pressure (master-cylinder hydraulic pressure, a vacuum booster hydraulic pressure) based upon an operation of a boosting device (e.g., a vacuum booster) operatively responsive to an operation of the brake pedal operation by a driver. The hydraulic pump is a pump (e.g., a gear pump) supplying brake fluid to a hydraulic circuit which can generate a wheel cylinder pressure.

The pressure control valve is configured to have for example a liner solenoid valve, which is a normally open or closed type, disposed between a hydraulic circuit, which is configured to generate the basic hydraulic pressure, and the hydraulic circuit, which is configured to generate the wheel cylinder pressure. Controlling the linear solenoid valve by use of a pressurizing hydraulic pressure generated by actuating the hydraulic pump leads to continuous adjustment of the amount of pressurization (pressure difference) relative to the basic hydraulic pressure, i.e., a value obtained by subtracting the basic hydraulic pressure from the wheel cylinder pressure. As a result, it is possible to continuously adjust the wheel cylinder pressure regardless of the basic hydraulic pressure, i.e., regardless of the operation of the brake-operating member.

A control unit of the brake apparatus includes a compensation braking force controlling means for controlling a compensation braking force in response to the operation of the brake operating member so that a characteristic of a total braking force relative to the operation of the brake operating member agrees with a predetermined target characteristic. The total braking force is a sum of the compensation braking force containing a pressurizing hydraulic braking force based upon at least the pressurization and a basic hydraulic pressure braking force based upon the basic hydraulic pressure. Alternatively, the compensation braking force can be configured only with the pressurizing hydraulic braking force or can be configured with the pressurizing hydraulic braking force and the regenerative braking force.

The compensation braking force controlling means includes: a judging means for judging whether the vehicle has stopped; and a limiting means for limiting the amount of pressurization via the pressure control valve when the judging means determines that the vehicle has stopped.

In this case, in the situation where the vehicle has stopped, the amount of pressurization is limited and, as a result, the wheel cylinder pressure (=basic hydraulic pressure+amount of pressurization) is limited. Therefore, in the situation where the vehicle has stopped, it is possible to prevent an unnecessary increase in the wheel cylinder pressure and to reduce load to be applied to various hydraulic equipments in the brake pressure hydraulic circuit.

As described above, in order to limit the amount of pressurization, the upper limit of the wheel cylinder pressure is set. When the vehicle is determined to have stopped, the amount of pressurization is limited so that the wheel cylinder pressure (=basic hydraulic pressure+the amount of pressurization) does not exceed the upper limit of the wheel cylinder pressure (hereinafter, referred to as wheel cylinder pressure upper limit).

As described above, in order to limit the amount of pressurization in a way that the wheel cylinder (=basic hydraulic pressure+the amount of pressurization) does not exceed the wheel cylinder pressure upper limit, more specifically, for example while the target wheel cylinder pressure, which is responsive to the operation of the brake operating member and corresponds to the target characteristic, exceeds the wheel cylinder pressure upper limit, the amount of pressurization is adjusted at a value obtained by subtracting the basic hydraulic pressure from the wheel cylinder pressure upper limit. Therefore, it is possible to maintain the wheel cylinder pressure at the wheel cylinder pressure upper limit while the target wheel cylinder pressure exceeds the wheel cylinder pressure upper limit in the situation that the vehicle is determined to have stopped.

In addition, when the wheel cylinder pressure is maintained at a constant level or vale by maintaining the pressure control valve at the closed state and by stopping the hydraulic pump as described above, it is preferable that the pressure control valve is maintained at the closed state and the hydraulic pump is stopped after the amount of pressurization is adjusted to the value obtained by subtracting the basic hydraulic pressure from the wheel cylinder pressure upper limit.

Therefore, the wheel cylinder pressure is maintained at the wheel cylinder pressure upper limit while the hydraulic pump is maintained in the off state. As a result, it is possible not to consume energy required to operate the hydraulic pump while the wheel cylinder pressure is maintained at the wheel cylinder pressure upper limit.

As described above, it is preferable that the wheel cylinder pressure upper limit is set to be a value or greater than that, which value is a vehicle-stopped-state maintaining wheel cylinder pressure being the lower limit of the wheel cylinder pressure required to maintain the vehicle in the stopped state. In this case, it is possible to minimize load applied to various hydraulic equipments in the brake pressure circuit while the vehicle is being maintained to have stopped.

Described above is that the wheel cylinder pressure upper limit is set so as to limit the amount of pressurization. Meanwhile, the upper limit of the amount of pressurization (hereinafter, referred to as a pressurization upper limit) can be set so as to the amount of pressurization. In this case, while the vehicle has stopped, the amount of pressurization can be limited not to exceed the pressurization upper limit.

As described above, in order to limit the amount of pressurization in a way that the amount of pressurization does not exceed the pressurization upper limit, more specifically, for example while a value, which is obtained by subtracting the basic hydraulic pressure responsive to the operation of the brake operating member from the target wheel cylinder pressure, which is responsive to the operation of the brake operating member and corresponds to the target characteristic, exceeds the pressurization upper limit, the amount of pressurization is maintained at the pressurization upper limit.

It is preferable that the pressurization upper limit is set at a value or greater than that, which value is obtained by subtracting the basic hydraulic pressure from the vehicle-stopped-state maintaining wheel cylinder pressure. Here, the basic hydraulic pressure corresponds to a case where the target wheel cylinder pressure, which corresponds to the target characteristic and is responsive to the operation of the brake operating member, agrees with the vehicle-stopped-state maintaining wheel cylinder pressure. Therefore, as described above, it is possible to minimize the load applied to various hydraulic equipment in the brake pressure circuit while the vehicle is maintained in the stopped state.

It is preferable that the vehicle-stopped-state maintaining wheel cylinder pressure is determined based upon a road gradient while the vehicle has stopped. The vehicle-stopped-state maintaining wheel cylinder pressure greatly depends on the road gradient, i.e., the gradient in the pitching direction of the vehicle, and increases in response to the increase in the road gradient. Therefore, as described above, the vehicle-stopped-state maintaining wheel cylinder pressure is determined appropriately.

Further, it is preferable that the gradient road is obtained based upon an output of a longitudinal acceleration sensor, which is mounted on the vehicle and detects acceleration in the longitudinal direction of the vehicle. The longitudinal acceleration sensor has a characteristic that it generates an output corresponding to an inclining angle in the vehicle pitching direction. Therefore, it is possible to detect the road gradient (the inclination in the vehicle pitching direction) accurately and to determine precisely the vehicle-stopped-state maintaining wheel cylinder pressure.

The principles, of the preferred embodiment and mode of operation of the present invention have been described in the foregoing specification. However, the invention, which is intended to be protected, is not to be construed as limited to the particular embodiment disclosed. Further, the embodiment described herein are to be regarded as illustrative rather than restrictive. Variations and changes may be made by others, and equivalents employed, without departing from the spirit of the present invention. Accordingly, it is expressly intended that all such variations, changes and equivalents that fall within the spirit and scope of the present invention as defined in the claims, be embraced thereby.

The invention claimed is:

1. A control unit of a brake apparatus for a vehicle, the brake apparatus including: a basic-hydraulic-pressure generating means for generating a basic hydraulic pressure according to an operation of a brake operating member by a driver; a hydraulic pump for generating a pressurizing hydraulic pressure higher than a pressure level of the basic hydraulic pressure; and a pressure control valve for controlling an amount of pressurization to the basic hydraulic pressure by use of the pressurizing hydraulic pressure generated by the hydraulic pump, wherein a sum of the basic hydraulic pressure and the pressurization corresponds to a wheel cylinder pressure applied to a wheel cylinder so as to generate at least a hydraulic braking force, the control unit of the brake apparatus, comprising:
a compensation braking force controlling means for controlling a compensation braking force in response to the operation of the brake operating member so that a characteristic of a total braking force relative to the operation of the brake operating member agrees with a predetermined target characteristic, the total braking force being a sum of at least the compensation braking force containing a pressurizing hydraulic braking force based upon the pressurization and a basic hydraulic pressure braking force based upon the basic hydraulic pressure,
the compensation braking force controlling means including:
a judging means for judging whether the vehicle has stopped; and
a limiting means for limiting the amount of pressurization via the pressure control valve when the judging means judges that the vehicle has stopped, wherein the limiting means includes an upper limit setting means for setting an upper limit of the wheel cylinder pressure, wherein, when the judging means judges that the vehicle has stopped, the limiting means limits the amount of pressurization in a manner that the wheel cylinder pressure does not exceed the upper limit, the limiting means limits the amount of pressurization to a value obtained by subtracting the basic hydraulic pressure from the upper limit while a target wheel cylinder pressure relative to the operation of the brake operating member exceeds the upper limit in a situation where the vehicle has stopped, and the target wheel cylinder corresponds to the predetermined target characteristic, and the control unit maintains the wheel cylinder pressure at a constant pressure value by maintaining the pressure control valve at a closed state and by stopping the hydraulic pump, and the limiting means maintains the pressure control valve at the closed state and stops the hydraulic pump after the limiting means limits the amount of pressurization to the value obtained by subtracting the basic hydraulic pressure from the upper limit while the target wheel cylinder pressure relative to the operation of the brake operating member exceeds the upper limit in a situation where the vehicle has stopped, and the target wheel cylinder corresponds to the predetermined target characteristic.

2. A control unit of a brake apparatus for a vehicle according to claim 1, wherein the upper limit setting means includes a vehicle-stopped-state maintaining pressure obtaining means for obtaining a vehicle-stopped-state maintaining wheel cylinder pressure, and the upper limit is set to be equal to or greater than the vehicle-stopped-state maintaining wheel cylinder pressure.

3. A control unit of a brake apparatus for a vehicle according to claim 2, wherein the vehicle-stopped-state maintaining pressure obtaining means includes a road gradient obtaining means for obtaining a gradient of a road on which the vehicle has stopped and determines the vehicle-stopped-state maintaining wheel cylinder pressure based upon the road gradient obtained by the road gradient obtaining means.

4. A control unit of a brake apparatus for a vehicle according to claim 3, wherein the road gradient obtaining means obtains the gradient of the road based upon an output of a longitudinal acceleration sensor detecting an acceleration of the vehicle in a longitudinal direction thereof.

5. A control unit of a brake apparatus for a vehicle, the brake apparatus including: a basic-hydraulic-pressure generating means for generating a basic hydraulic pressure according to an operation of a brake operating member by a driver; a hydraulic pump for generating a pressurizing hydraulic pressure higher than a pressure level of the basic hydraulic pressure; and a pressure control valve for controlling an amount of pressurization to the basic hydraulic pressure by use of the pressurizing hydraulic pressure generated by the hydraulic pump, wherein a sum of the basic hydraulic pressure and the pressurization corresponds to a wheel cylinder pressure applied to a wheel cylinder so as to generate at least a hydraulic braking force, the control unit of the brake apparatus, comprising:
a compensation braking force controlling means for controlling a compensation braking force in response to the operation of the brake operating member so that a characteristic of a total braking force relative to the operation of the brake operating member agrees with a predetermined target characteristic, the total braking force being a sum of at least the compensation braking force containing a pressurizing hydraulic braking force based upon the pressurization and a basic hydraulic pressure braking force based upon the basic hydraulic pressure, the compensation braking force controlling means including:

a judging means for judging whether the vehicle has stopped; and a limiting means for limiting the amount of pressurization via the pressure control valve when the judging means judges that the vehicle has stopped, wherein the limiting means includes an upper limit setting means for setting an upper limit of the amount of pressurization, and the upper limit setting means limits the amount of pressurization so as not to exceed the upper limit when the judging means judges that the vehicle has stopped, and wherein the limiting means maintains the amount of pressurization at the upper limit while a value, which is obtained by subtracting the basic hydraulic pressure from a target wheel cylinder pressure corresponding to the operation of the brake operating member, exceeds the upper limit in a situation where the judging means judges that the vehicle has stopped.

6. A control unit of a brake apparatus for a vehicle according to claim 5, wherein the upper limit setting means includes a vehicle-stopped-state maintaining pressure obtaining means for obtaining a vehicle-stopped-state maintaining wheel cylinder pressure that is a lower limit of a wheel cylinder pressure required to maintain the vehicle in a stopped state, and the upper limit is set at a value or more, which value is obtained by subtracting a basic hydraulic pressure from the vehicle-stopped-state maintaining wheel cylinder pressure, the basic hydraulic pressure being a value corresponding to a case where a target wheel cylinder pressure, which corresponds to the target characteristic and is responsive to the operation of the brake operating member, agrees with the vehicle-stopped-state maintaining wheel cylinder pressure.

7. A control unit of a brake apparatus for a vehicle according to claim 6, wherein the vehicle-stopped-state maintaining pressure obtaining means includes a road gradient obtaining means for obtaining a gradient of a road on which the vehicle has stopped and determines the vehicle-stopped-state maintaining wheel cylinder pressure based upon the road gradient obtained by the road gradient obtaining means.

8. A control unit of a brake apparatus for a vehicle according to claim 7, wherein the road gradient obtaining means obtains the gradient of the road based upon an output of a longitudinal acceleration sensor detecting an acceleration of the vehicle in a longitudinal direction thereof.

* * * * *